United States Patent
Clark et al.

(10) Patent No.: US 11,420,586 B2
(45) Date of Patent: *Aug. 23, 2022

(54) TORTUOUS PATH FILTER FOR AIRBAG INFLATOR

(71) Applicant: Autoliv ASP, Incorporated, Ogden, UT (US)

(72) Inventors: Marcus T. Clark, Kaysville, UT (US); Nyle K. Longhurst, Layton, UT (US); Eric V. Callister, North Logan, UT (US)

(73) Assignee: Autoliv ASP, Incorporated, Ogden, UT (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/326,648

(22) PCT Filed: Aug. 21, 2017

(86) PCT No.: PCT/US2017/047782
§ 371 (c)(1),
(2) Date: Feb. 19, 2019

(87) PCT Pub. No.: WO2018/039116
PCT Pub. Date: Mar. 1, 2018

(65) Prior Publication Data
US 2021/0078523 A1   Mar. 18, 2021

(51) Int. Cl.
*B60R 21/261*   (2011.01)
*B01D 46/24*   (2006.01)
(Continued)

(52) U.S. Cl.
CPC ........ *B60R 21/261* (2013.01); *B01D 46/2403* (2013.01); *B01D 46/528* (2013.01);
(Continued)

(58) Field of Classification Search
CPC ............... B60R 21/261; B60R 21/268; B60R 2021/26011; B01D 46/2403;
(Continued)

(56) References Cited

U.S. PATENT DOCUMENTS 2,296,566 A * 9/1942 Neumann ............. B01D 46/00
96/392
2,816,665 A * 12/1957 Layte .................... B01D 29/111
210/494.2

(Continued)

FOREIGN PATENT DOCUMENTS

DE   102018125081 A1 * 4/2020
WO   WO-2017135203 A1 * 8/2017 ............. B01D 46/26

*Primary Examiner* — James A English
*Assistant Examiner* — Scott F. Underwood
(74) *Attorney, Agent, or Firm* — Madson IP, P.C.

(57) ABSTRACT

An airbag assembly may include an airbag and an inflator that provides inflation gas to inflate the airbag. A filter module may be positioned such that inflation gas exiting the inflator must first pass through the filter module. The filter module may be formed of a sheet of metal that is wrapped into a generally spiraling tubular shape. The filter module may have an inner layer, an intermediate layer, and an outer layer. The intermediate layer generally encircles the inner layer, and the outer layer generally encircles the inner layer and the intermediate layer in a spiraling fashion. The inner layer, the intermediate layer, and the outer layer each may have a pattern of holes and dimples that are separate from and/or displaced from each other. The dimples may protrude toward an adjacent layer to maintain spacing to enable relatively unrestricted gas flow from the holes of the inner layer through unaligned holes of the intermediate layer and the outer layer. The resulting tortuous gas flow path may help to slow, cool, and/or purify the gas before it exits the inflator.

4 Claims, 6 Drawing Sheets

(51) Int. Cl.
  *B01D 46/52* (2006.01)
  *B60R 21/268* (2011.01)
  *B60R 21/26* (2011.01)
(52) U.S. Cl.
  CPC ...... *B60R 21/268* (2013.01); *B01D 2275/105* (2013.01); *B01D 2275/302* (2013.01); *B01D 2279/10* (2013.01); *B60R 2021/26011* (2013.01)
(58) Field of Classification Search
  CPC ............ B01D 46/528; B01D 2275/105; B01D 2275/302; B01D 2279/10
  See application file for complete search history.

(56) References Cited

U.S. PATENT DOCUMENTS

| | | | | |
|---|---|---|---|---|
| 5,100,171 A * | 3/1992 | Faigle | ............... | B01D 46/12 280/736 |
| 5,584,506 A * | 12/1996 | Van Wynsberghe | ............... | B60R 21/261 280/736 |
| 6,065,774 A * | 5/2000 | Cabrera | ............... | C06D 5/06 280/740 |
| 8,585,792 B2 * | 11/2013 | Zengerle | ............... | B01D 39/12 242/360 |
| 8,702,125 B1 * | 4/2014 | Smith | ............... | B60R 21/2644 280/740 |
| 10,676,062 B2 * | 6/2020 | Adamczyk | ............... | B01D 39/2027 |
| 2008/0150260 A1 * | 6/2008 | Whang | ............... | B60R 21/2644 280/736 |
| 2009/0184504 A1 * | 7/2009 | Greenwood | ............... | B21D 31/04 428/34.1 |
| 2012/0067015 A1 * | 3/2012 | Greenwood | ............... | B01D 39/12 55/525 |
| 2012/0326423 A1 * | 12/2012 | Hoffman | ............... | B01D 45/08 55/385.3 |
| 2013/0291756 A1 * | 11/2013 | Ohsugi | ............... | B60R 21/2644 102/530 |
| 2015/0197213 A1 * | 7/2015 | Clark | ............... | B60R 21/26 29/896.62 |

* cited by examiner

TORTUOUS PATH FILTER FOR AIRBAG INFLATOR

CROSS-REFERENCE TO RELATED APPLICATIONS

This application is the U.S. national stage of PCT Application No. PCT/US2017/047782 filed on Aug. 21, 2017, which claims priority to U.S. application Ser. No. 15/246,337 filed on Aug. 24, 2016, the entire content of each above-referenced application is incorporated herein by this reference.

TECHNICAL FIELD

The present invention relates to automotive safety. More specifically, the present invention relates to airbag inflators that enhance the cost-effectiveness of airbag systems.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge fill the airbags, which immediately inflate in front of the driver and passenger to protect them from harmful impact with the interior of the car. Typically, airbags are concealed within the vehicle trim to be invisible during normal vehicle operation. In addition to the driver's side and passenger's side airbags, many vehicles also have other airbags such as side airbags and/or inflatable curtains that inflate outboard of vehicle occupants to provide side impact, rollover, ejection, and/or small overlap collision protection, knee airbags, inflatable harnesses, and the like.

The inflator is a critical part of the airbag assembly because it supplies the inflation gas needed to inflate the airbag cushion. Typically, inflators are compressed gas, pyrotechnic, or hybrid inflators. "Compressed gas" inflators contain gas under pressure, while "pyrotechnic" inflators contain a pyrotechnic gas generant that ignites to produce the gas. "Hybrid" inflators typically use both compressed gas and a pyrotechnic charge. Some inflators are "dual stage," meaning that they can receive two independent activation signals to enable production of a selectively variable quantity of inflation gas, and others have only a single stage. However, single stage inflators can have multiple timed events, such as the ignition of multiple separate pyrotechnic charges and/or the release of distinct volumes of compressed gas, that are all triggered by a single activation signal.

Inflators of all types are typically made from a wide variety of parts. Each inflator may contain a selection of chambers, diffusers, filters, frangible membranes, initiators, generants, baffles, and containers, attachment hardware, and other components. Each of these parts adds significantly to the cost of the inflator. Hence, the inflator typically makes up a large portion of the cost of an airbag assembly.

Additionally, a series of different manufacturing steps may be needed to manufacture each inflator. The quantity of steps involved not only further increases the cost of potential inflators, it also increases the likelihood of defects in material or workmanship in the finished inflator.

SUMMARY OF THE INVENTION

The various systems and methods of the present disclosure have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The exemplary embodiments of the present disclosure may have other benefits that are not specifically set forth herein.

To achieve the foregoing, the exemplary embodiments broadly described herein comprise an inflator that may be part of an airbag assembly for protecting a vehicle occupant from injury. An inflator may comprise a housing having a central longitudinal axis and may have one or more diffuser holes through which inflation gas is emitted to fill an airbag. Inflators typically have a gas source contained within a chamber defined within the housing. That gas source may be compressed gas, a pyrotechnic gas generant, or combination of compressed gas and generant. In response to receipt ant activation signal, the gas source provides a gas.

In some embodiments, the inflator will have a filter or filter module designed to slow gas flow, to cool the gas before entering the airbag, and to capture impurities within the gas. In the present disclosure, exemplary embodiments have a filter module comprising a unitary body (that may be made of a metal, such as steel) with an inner layer portion, an intermediate layer portion, and an outer layer portion that is prepared and then formed into a rolled spiral of a generally tubular shape by wrapping around a correctly-sized mandrel or other means. The filter module is then positioned within the housing to surround a central longitudinal axis. As rolled and positioned within the housing of the inflator, the filter module defines an inner layer, an intermediate layer, and an outer layer and maintains its shape without the need for welding.

The inner layer comprises a first array of holes that, in some embodiments, are formed by perforation. The inflation gas is received internal of the inner layer and passes through the first array of holes to reach the intermediate layer. The intermediate layer comprises a second array of holes that may be formed by perforation. Each hole of the second array of holes does not align radially with the hole of the first array of holes nearest such hole of the second array of holes. This causes the inflation gas passing through the inner layer to change direction and flow axially in search of an exit.

The intermediate layer is positioned such that the inflation gas passes through the second array of holes to reach the outer layer. The outer layer comprises a third array of holes. Again, each hole of the second array of holes does not align radially with the hole of the third array of holes nearest such hole of the second array of holes. The inflation gas, this time passing through the intermediate layer, is once again forced to change direction and flow axially in search of an exit. Each hole of the third array of holes does not align with any of the one or more diffuser holes. Before the inflation gas can exit the inflator through any of the diffuser holes, the inflation gas must change direction again and travel axially in search of a diffuser hole through which to exit.

Of course, it should be understood that there may be more than one intermediate layer and that intermediate layers need not necessarily have the same array of holes.

The exemplary embodiments of the present disclosure have a filter module with a unitary body having a plurality of protrusions. At least one protrusion of the plurality of protrusions is disposed adjacent at least one of the holes of the first array of holes of the inner layer and some embodiments may have one protrusion disposed adjacent each of the holes of the first array of holes of the inner layer. At least one other protrusion of the plurality of protrusions is disposed adjacent at least one of the holes of the second array of holes of the intermediate layer. At least another protrusion of the plurality of protrusions is disposed adjacent at least one of the holes of the third array of holes of the outer layer. In some embodiments, each protrusion of the inner layer protrudes toward the intermediate layer, each protrusion of the intermediate layer protrudes toward the outer layer, and each protrusion of the outer layer protrudes toward an interior wall of the housing. The protrusions are sized and shaped to maintain a gap between the inner layer and the intermediate layer, between the intermediate layer and the outer layer, and between the outer layer and the interior wall of the housing. This gap defines a spiraling plenum through which the inflation gas passes on a tortuous path from the gas source through the filter module to exit the inflator through the one or more diffuser holes.

It should be understood that the protrusions can take on many forms in many sizes and shapes without departing from the spirit of the invention. For example, the protrusions may be dimples that form a mound but do not perforate the unitary body of the filter module, elongated dimples, ridges, or inclined flaps made by piercing the unitary body (forming holes in the form of slits) and bending the flaps on an incline to reach a desired height. So long as the number of protrusions are of sufficient number, size and height and dispersed sufficiently to maintain the gap that defines the spiral plenum, protrusions serve their function while strengthening the layers of the filter module. Of course, having more protrusions will dictate that the flow of inflation gas that must move around such protrusions take more tortuous paths to exit the inflator; however, the number, size, and distribution of the protrusions and the holes may be adjusted and may be fine-tuned to optimize the desired amount of flow restriction, the desired amount of cooling, and/or the desired amount of impurities captured for filling an airbag in the most material- and cost-effective way. Since the desired amount of flow restriction, the desired amount of cooling, and/or the desired amount of impurities captured for filling an airbag is dependent upon the size, shape, location, and the desired rate of deployment, the number, size, and distribution of the protrusions and the holes should be adjusted and fine-tuned to optimize the effectiveness of the filter module.

In some embodiments, the holes of the first array of holes in the inner layer are each larger than the holes of the second array of holes in the intermediate layer. By enlarging the holes in the first array of holes in the inner layer, unwanted erosion of the intermediate layer where the hot inflation gas jets straight through the holes of the first array of holes against the inside wall of the intermediate layer is minimized. The size of the holes of the first array of holes may be enlarged until erosion is no longer observed. Similarly, the holes of the second array of holes can also be enlarged to avoid erosion on the outer layer of the filter module.

Additionally, a desired choking point in the flow of inflation gas through the inflator may be determined by adjusting the number and/or size of the holes in the first array of holes, in the second array of holes, and in the third array of holes, as well as the number and/or size of the diffuser holes.

Prior to forming the unitary body of the filter module into a rolled spiral of generally tubular shape by forming around a correctly-sized mandrel or other means, the unitary body is typically flat and has, in some embodiments, a length and a width of a rectangular shape. The first array of holes in the unitary body is arranged in a first grid such that each hole in the first array of holes aligns longitudinally with at least one other of the holes of the first array of holes and also aligns laterally with at least one differing hole of the first array of holes. In one exemplary embodiment, the first array of holes is arranged in a first grid wherein each line of longitudinally aligned holes has the same number of holes and each line of laterally aligned holes has the same number of holes.

The second array of holes is arranged in a second grid such that each hole in the second array of holes aligns longitudinally with at least one other of the holes of the second array of holes and also aligns laterally with at least one differing hole of the second array of holes. However, the holes aligned longitudinally in the first array of holes do not align longitudinally with the holes aligned longitudinally in the second array of holes. This non-alignment causes the flow of inflation gas to divert and travel axially before passing through the second array of holes. In another exemplary embodiment, the second array of holes is arranged in a second grid wherein each line of longitudinally aligned holes has the same number of holes and each line of laterally aligned holes has the same number of holes.

The third array of holes arranged in a third grid such that each hole in the third array of holes aligns longitudinally with at least one other of the holes of the third array of holes and also aligns laterally with at least one differing hole of the third array of holes. The holes aligned longitudinally in the third array of holes do not align longitudinally with the holes aligned longitudinally in the second array of holes. This non-alignment causes the flow of inflation gas to divert and travel axially before passing through the third array of holes. In yet another exemplary embodiment, the third array of holes is arranged in a third grid wherein each line of longitudinally aligned holes has the same number of holes and each line of laterally aligned holes has the same number of holes.

In another exemplary embodiment, one or more of the first array of holes, the second array of holes, and the third array of holes has a staggered array pattern. An exemplary staggered array pattern may have multiple lines of longitudinally aligned holes wherein each hole of any of the multiple lines of longitudinally aligned holes also aligns laterally with at least one hole of another of the multiple lines of longitudinally aligned holes, but does not align laterally with any of the holes of at least one other of the multiple lines of longitudinally aligned holes.

In some embodiments, the unitary body of the filter module is wider at the outer layer than at the inner and intermediate layers. When wrapped into a spiral, the outer layer is longer at one end than the inner and intermediate layers. More space is provided at that end because the inner diameter of the outer layer is larger than the inner diameter of the inner layer. For inflators with frangible burst disks disposed between the gas source and the filter module, the burst disk has a larger diameter opening capability than it would have had if the inner layer abutted the burst disk. This wider configuration for the outer layer enables the burst disk to open over the full, inner diameter of the outer layer. Other applications may require that the inner or intermediate layer(s) be wider that the other layers for various reasons.

The exemplary embodiments of the present disclosure include a unitary filter module for insertion into an inflator for an airbag assembly. Inflators having an elongated housing with a central longitudinal axis are particularly suitable. Such inflators typically have at least one diffuser hole and a gas source contained within a chamber defined within the housing. In response to an activation signal, the gas source provides a gas. Such inflators can use compressed gas, pyrotechnic generants, or a hybrid thereof. Such inflators also frequently have filters to slow the gas flow, cool the gas, and filter out impurities.

The exemplary embodiments of the unitary filter module of the present disclosure have a flat mode used to pre-prep the unitary body of the filter module for wrapping into a spiraling rolled configuration for insertion into the housing of the inflator (herein referred to as an "inserted spiral rolled mode"). The unitary body has a length (a longitudinal direction) and a width (a lateral direction) and is generally divided into an inner layer portion, an intermediate layer portion, and an outer layer portion.

In the flat mode, the inner layer portion is prepared with a first array of holes arranged in a first grid. This first grid may have any of a number of patterns, but one exemplary pattern of holes are arranged such that each hole in the first array of holes aligns longitudinally with at least one other of the holes of the first array of holes and also aligns laterally with at least one differing hole of the first array of holes. The intermediate layer portion comprises a second array of holes arranged in a second grid. The second grid need not have the same number, pattern, or size of holes as the first array of holes. However, for the sake of brevity description, one exemplary embodiment has a pattern of holes wherein each hole in the second array of holes aligns longitudinally with at least one other of the holes of the second array of holes and also aligns laterally with at least one differing hole of the second array of holes. But, the holes aligned longitudinally in the first array of holes do not align longitudinally with the holes aligned longitudinally in the second array of holes. This misalignment will cause the inflation gas to be redirected after passing through the first array of holes of the inner layer portion.

The outer layer portion comprises a third array of holes arranged in a third grid. The third grid may be identical to the first grid, but need not be so. An exemplary embodiment of the third grid has a pattern of holes wherein each hole in the third array of holes aligns longitudinally with at least one other of the holes of the third array of holes and also aligns laterally with at least one differing hole of the third array of holes. But, the holes aligned longitudinally in the third array of holes do not align longitudinally with the holes aligned longitudinally in the second array of holes. Again, this misalignment will cause the inflation gas to be redirected after passing through the second array of holes of the intermediate layer portion.

The unitary body (as pre-prepped, see description above) in the inserted spiral rolled mode may be formed by wrapping the unitary body around a correctly-sized mandrel or by other suitable means. As wrapped, the filter module does not need to be welded to hold its shape once inserted into the inflator. As inserted, the filter module is coaxial with the central longitudinal axis of the housing of the inflator in a rolled, spiraling fashion. When disposed within the housing, the filter module comprised of the spiraling unitary body has a configuration such that the inner layer portion defines an inner layer, the intermediate layer portion defines an intermediate layer, and the outer layer portion defines an outer layer.

In one exemplary embodiment, the first array of holes of the inner layer portion surround the central longitudinal axis such that the longitudinally aligned holes of the first array of holes define a first set of planes each substantially perpendicular to the central longitudinal axis. This occurs because the unitary body has been rolled about a lateral axis and then placed within the inflator so that the lateral axis of the rolled unitary body aligns with the central longitudinal axis of the inflator housing, or is at least parallel and closely proximate to the central longitudinal axis. Consequently, the laterally aligned holes of the first array of holes define a first set of axes substantially parallel to the central longitudinal axis. The inner layer is positioned such that the gas passes through the first array of holes to reach the intermediate layer.

Similarly, the second array of holes of the intermediate layer portion surrounds the inner layer and the central longitudinal axis. Hence, the longitudinally aligned holes of the second array of holes define a second set of planes each substantially perpendicular to the central longitudinal axis and each offset from the first set of planes. The laterally aligned holes of the second array of holes define a second set of axes substantially parallel to the central longitudinal axis. The intermediate layer is positioned such that the gas passes through the second array of holes to reach the outer layer.

The third array of holes of the outer layer surrounds the inner layer, the intermediate layer, and the central longitudinal axis. The longitudinally aligned holes of the third array of holes define a third set of planes each substantially perpendicular to the central longitudinal axis and each offset from the second set of planes. The laterally aligned holes of the third array of holes define a third set of axes substantially parallel to the central longitudinal axis. The outer layer is positioned such that the inflation gas passes through the third array of holes to reach the interior wall of the housing and at least one diffuser hole.

As disclosed herein, the intermediate layer comprises a second array of holes, each hole of the second array of holes is not aligned with the hole of the first array of holes nearest such hole of the second array of holes. Hence, the intermediate layer is positioned such that the inflation gas is redirected to move axially before the inflation gas passes through the second array of holes to reach the outer layer. The outer layer comprises a third array of holes, each hole of the third array of holes is not aligned with the hole of the second array of holes nearest such hole of the third array of holes. Again the outer layer is positioned such that the inflation gas is redirected to move axially before the inflation gas passes through the third array of holes to reach the at least one diffuser hole of the housing.

Each exemplary embodiment of the filter module has a plurality of protrusions. These protrusions are disposed such that the inner layer portion (and therefore the inner layer) has at least one protrusion, the intermediate layer portion (and therefore the inner layer) has at least one protrusion, and the outer layer portion (and therefore the outer layer) has at least one protrusion. Each protrusion disposed on the inner layer portion is adjacent at least one of the holes of the first array of holes of the inner layer. Each protrusion disposed on the intermediate layer portion is adjacent at least one of the holes of the second array of holes of the intermediate layer. Each protrusion disposed on the outer layer portion is adjacent at least one of the holes of the third array of holes of the outer layer. Such protrusions maintain a gap between the inner layer and the intermediate layer, between the intermediate layer and the outer layer, and between the outer layer and the exterior wall to define a spiraling plenum through which the inflation gas passes on a tortuous path from the gas source through the filter module to exit through at least one diffuser hole in the inflator.

In another exemplary embodiment of the unitary filter module of the present disclosure, the holes may be arranged in a staggered pattern. This staggered pattern may be incorporated into the first array of holes in the inner layer, the second array of holes in the intermediate layer, and/or the third array of holes in the outer layer. One example of a staggered pattern has multiple lines of longitudinally aligned holes and each hole of any of the multiple lines of longitudinally aligned holes aligns laterally with at least one hole of another of the multiple lines of longitudinally aligned holes, but does not align laterally with any of the holes of at least one other of the multiple lines of longitudinally aligned holes.

These and other features and advantages of the exemplary embodiments of the present disclosure will become more fully apparent from the following detailed description and appended claims, or may be learned by the practice of the invention as set forth herein.

REFERENCE NUMBERS

| | |
|---|---|
| filter module 10 | unitary body 12 |
| length L | longitudinal direction 14 |
| width W | lateral direction 16 |
| inner layer portion 18 | intermediate layer portion 20 |
| outer layer portion 22 | first array of holes 24 |
| first grid 26 | holes (within the first array) 28 |
| second array of holes 30 | second grid 32 |
| holes (within the second array) 34 | third array of holes 36 |
| third grid 38 | holes (within the third array) 40 |
| protrusions 42 | longitudinal line 43 |
| inflator 44 | longitudinal line 45 |
| central longitudinal axis A | housing 46 |
| lateral line 47 | inner layer 48 |
| lateral line 49 | intermediate layer 50 |
| dimples 51 | outer layer 52 |
| elongated dimples 53 | first set of planes $P_1$ |
| first set of axes $L_1$ | inflation gas G |
| third set of planes $P_3$ | third set of axes $L_3$ |
| interior wall 54 | inclined flaps 55 |
| diffuser hole 56 | gap 58 |
| spiraling plenum 60 | flow (arrows) 61 |
| gas source 62 | staggered pattern 64 |
| space 66 | inner diameter (outer layer) 68 |
| inner diameter (inner layer) 70 | burst disk 72 |

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of exemplary embodiments of the apparatus, system, and method of the present invention, as represented in FIGS. 1 through 4, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid that exits one feature is able to pass into or otherwise contact the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The word "unitary" is used herein to mean a single unit. Such single unit may be made from one piece of material, but need not be so. More than one piece of material can be formed into a single unit. So long as an article functions as a single unit, that article is considered to be "unitary."

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
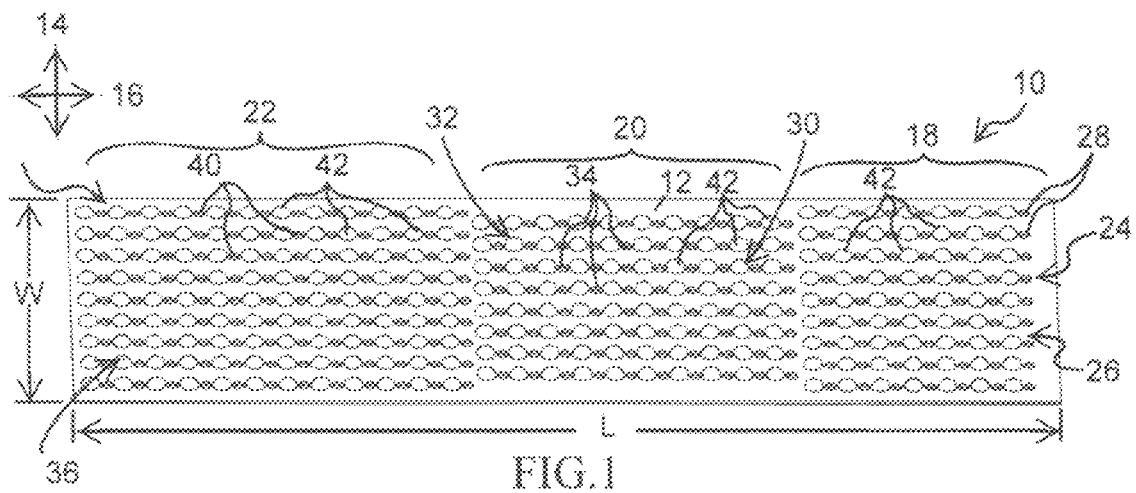
FIG. 1 is a perspective view of an exemplary embodiment of a unitary body for a filter module in the flat mode showing protrusions adjacent holes.
Figure 2:
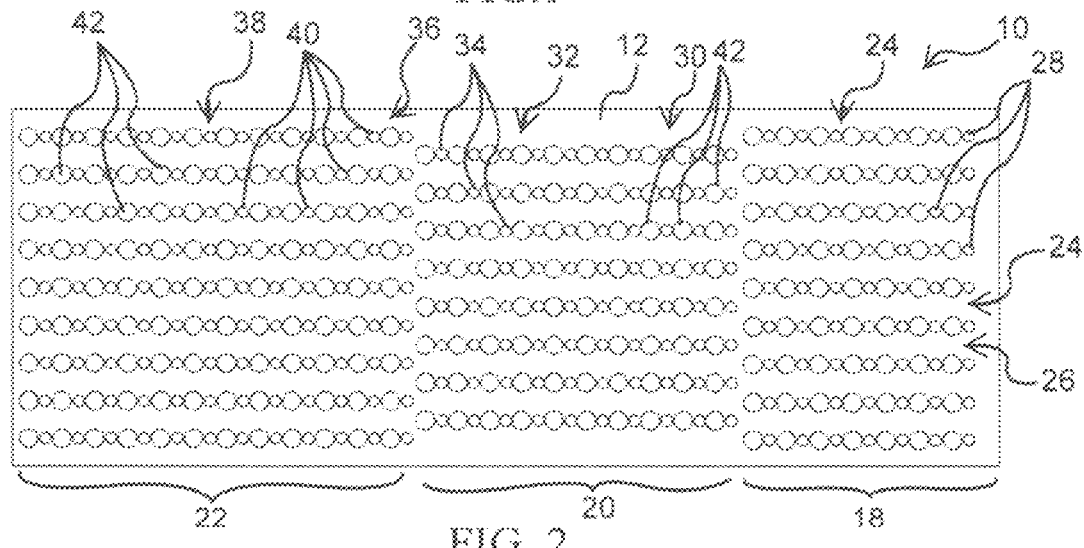
FIG. 2 is a plan view of the exemplary unitary body of FIG. 1 in a flat mode.
Figure 5:
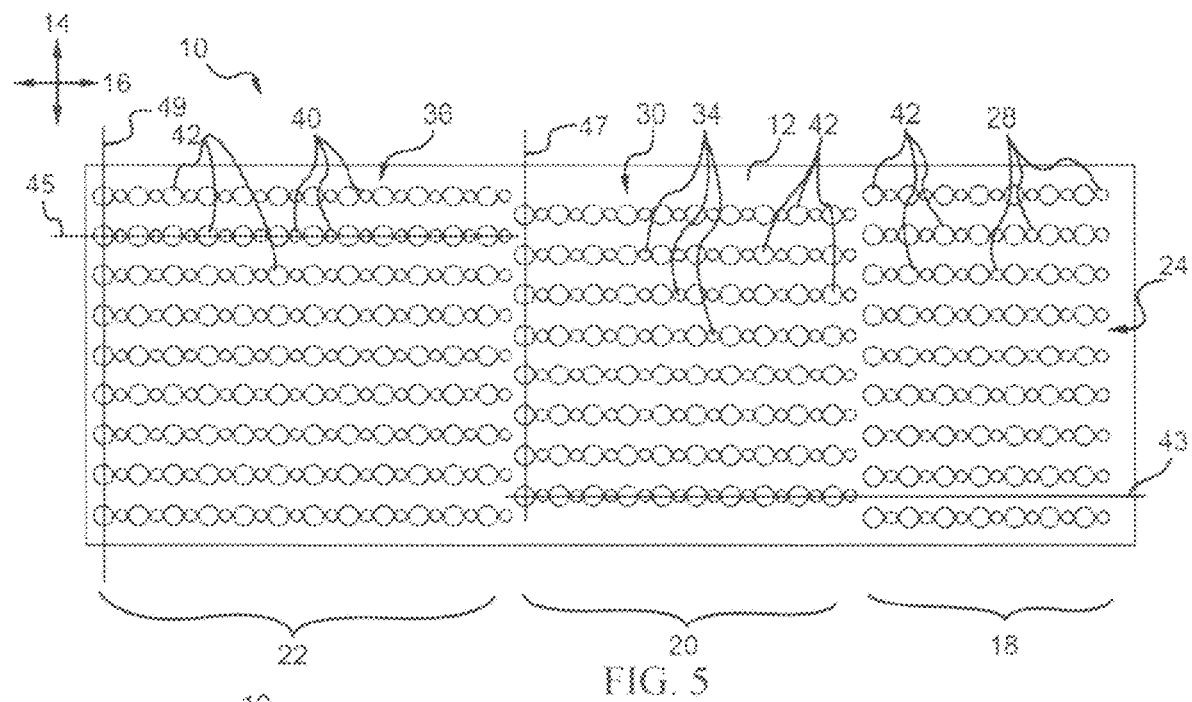
FIG. 5 is a plan view of the exemplary unitary body in a flat mode and showing exemplary longitudinal and lateral lines.

Referring to FIGS. 1, 2 and 5, an exemplary embodiment of a unitary body 12 for a filter module 10 is shown in the flat mode. The unitary body 12 has a length L (a longitudinal direction 14) and a width W (a lateral direction 16) and is generally divided into an inner layer portion 18, an intermediate layer portion 20, and an outer layer portion 22.

In the flat mode, the inner layer portion 18 is prepared with a first array of holes 24 arranged in a first grid 26. This first grid 26 may have any of a number of patterns, but one exemplary pattern of holes are arranged such that each hole 28 in the first array of holes 24 aligns longitudinally with at least one other of the holes of the first array of holes 24 and also aligns laterally with at least one differing hole of the first array of holes 24. The intermediate layer portion 20 comprises a second array of holes 30 arranged in a second grid 32. The second grid 32 need not have the same number, pattern, or size of holes as the first array of holes 24.

Although exemplary embodiments are disclosed herein, for the sake of brevity in the description, not all possible arrays will be disclosed herein. Those skilled in the art, armed with this disclosure, may fashion and prepare many different arrays of holes that will not depart from the spirit of this disclosure. Also, for the sake of brevity and so not to obscure the features being disclosed a single intermediate layer portion 20 is shown throughout the drawings. It should be understood, however, that there may be more than one intermediate layer portion 20 and that intermediate layers need not necessarily have the same array of holes.

One exemplary embodiment, shown in FIG. 5, has a pattern of holes wherein each hole 34 in the second array of holes 30 aligns longitudinally with at least one other of the holes 34 of the second array of holes 30 and also aligns laterally with at least one differing hole 34 of the second array of holes 30. But, the holes 28 aligned longitudinally in the first array of holes 24 do not align longitudinally with the holes 34 aligned longitudinally in the second array of holes 30. This misalignment will cause the inflation gas to be redirected after passing through the first array of holes 24 of the inner layer portion 18.

The outer layer portion 22 comprises a third array of holes 36 arranged in a third grid 38. The third grid 38 may be identical to the first grid 26, but need not be so. An exemplary embodiment of the third grid 38 has a pattern of holes wherein each hole 40 in the third array of holes 36 aligns longitudinally with at least one other of the holes 40 of the third array of holes 36 and also aligns laterally with at least one differing hole 40 of the third array of holes 36. But, the holes 40 aligned longitudinally in the third array of holes 36 do not align longitudinally with the holes 34 aligned longitudinally in the second array of holes 34. Again, this misalignment will cause the inflation gas to be redirected after passing through the second array of holes 34 of the intermediate layer portion 20.

Each exemplary embodiment of the filter module 10 has a plurality of protrusions 42. These protrusions 42 are disposed such that the inner layer portion 18 has at least one protrusion 42 and likely several, the intermediate layer portion 20 has at least one protrusion 42 and likely several, and the outer layer portion 22 has at least one protrusion 42 and likely several. Each protrusion 42 disposed on the inner layer portion 18 is adjacent at least one of the holes 28 of the first array of holes 24 of the inner layer portion 18. Each protrusion 42 disposed on the intermediate layer portion 20 is adjacent at least one of the holes 34 of the second array of holes 30 of the intermediate layer portion 20. Each protrusion 42 disposed on the outer layer portion 22 is adjacent at least one of the holes 40 of the third array of holes 36 of the outer layer portion 22. Such protrusions 42 are designed and located to maintain a gap (not shown in FIGS. 1, 2 and 5, see FIGS. 3, 4, 8, 10 and 11) between the inner layer and the intermediate layer, between the intermediate layer and the outer layer, and between the outer layer and the exterior wall to define a spiraling plenum through which the inflation gas passes on a tortuous path from the gas source through the filter module to exit through at least one diffuser hole in the inflator 44.

With the exemplary embodiment shown in FIG. 5, each protrusion 42 aligns longitudinally with at least one other protrusion 42 along a longitudinal line. Such longitudinal line within the second array of holes 30 passes through holes 34 and protrusions and is shown as longitudinal line 43. Another such longitudinal line within the third array of holes 36 passes through holes 40 and protrusions 42 and is shown as longitudinal line 45. The longitudinal lines of the second array of holes 30, of which longitudinal line 43 is one, do not align with any of the longitudinal lines of the first array of holes 24 or the third array of holes 36, of which longitudinal line 45 is one.

Similarly, in FIG. 5, each protrusion 42 aligns laterally with at least one other protrusion 42. Such a lateral line is shown within the intermediate portion 20 as lateral line 47, and another lateral line is shown within the outer layer portion 22 as lateral line 49. This lateral alignment, in cooperation with the longitudinal misalignment of holes 28, 34, 40 virtually assures that holes 28, 34, 40 will not align from layer to layer of the filter module 10. As a result, the flow of inflation gas through the filter module 10 will necessarily travel a tortuous path.

Figure 12:
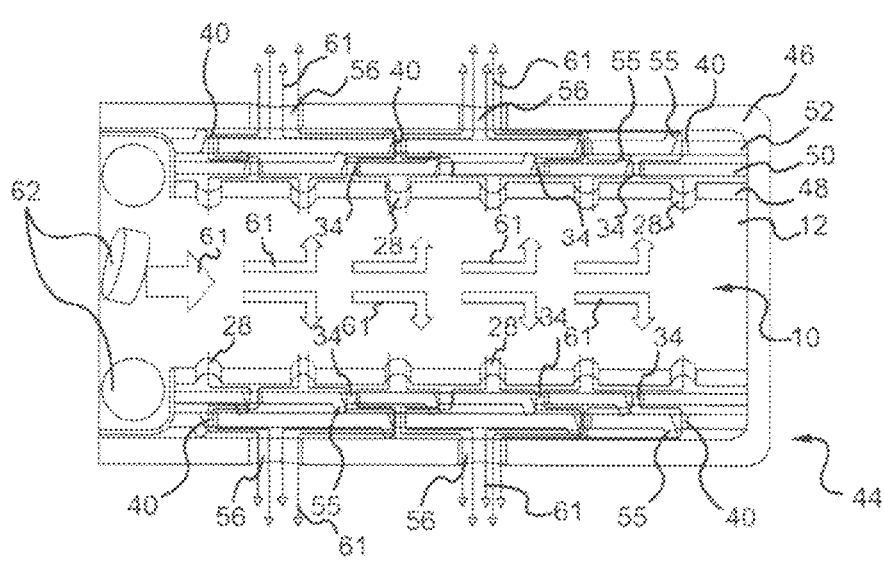
FIG. 12 is partial, section view of an inflator having an alternative exemplary filter module disposed within the inflator housing in an inserted, spiral rolled mode, wherein each hole forms an inclined flap that serves as a protrusion.

Again, it should be understood that the protrusions 42 can take on many forms in many sizes and shapes without departing from the spirit of this disclosure. For example, the protrusions 42 may be dimples 51 (see FIGS. 5 and 6) that form a mound but do not perforate the unitary body 12 of the filter module 10, elongated dimples 53 (see FIGS. 7 and 9), ridges, or inclined flaps 55 (see FIG. 12) made by piercing the unitary body 12 (forming holes in the form of slits) and bending the flaps 55 on an incline to reach a desired height. So long as the number of protrusions 42 are of sufficient number, size and height and dispersed sufficiently to maintain the gap 58 that defines the spiral plenum 60, protrusions 42 serve their function while strengthening the layers, 48, 50, 52 of the filter module 10. Of course, having more protrusions 42 will dictate that the flow of inflation gas that must move around such protrusions 42 will take more tortuous paths to exit the inflator 44; however, the number, size, and distribution of the protrusions 42 and the holes 28, 34, 40 may be adjusted and may be fine-tuned to optimize the desired amount of flow restriction, the desired amount of cooling, and/or the desired amount of impurities capture for the filling of an airbag in the most material-effective and cost-effective way. Since the desired amount of flow restriction, the desired amount of cooling, and/or the desired amount of impurities capture for the filling an airbag is dependent upon the size, shape, location, and the desired rate of deployment of the airbag, the number, size, and distribution of the protrusions 42 and the holes 28, 34, 40 should be adjusted and fine-tuned to optimize the effectiveness of the filter module 10 used in each type of inflator.

Figure 3:
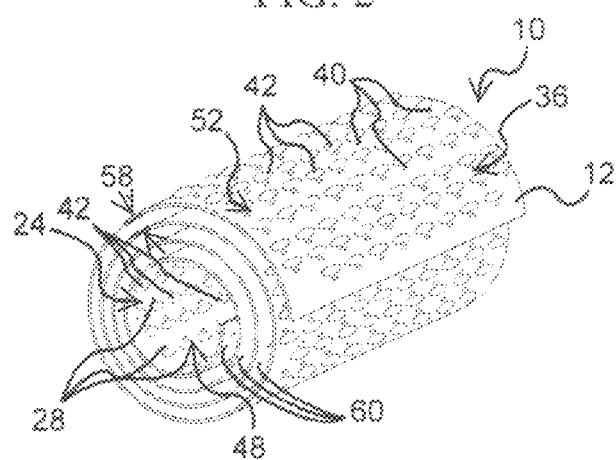
FIG. 3 is a perspective view of the exemplary unitary body of FIG. 1 in a spiral rolled mode.
Figure 4:
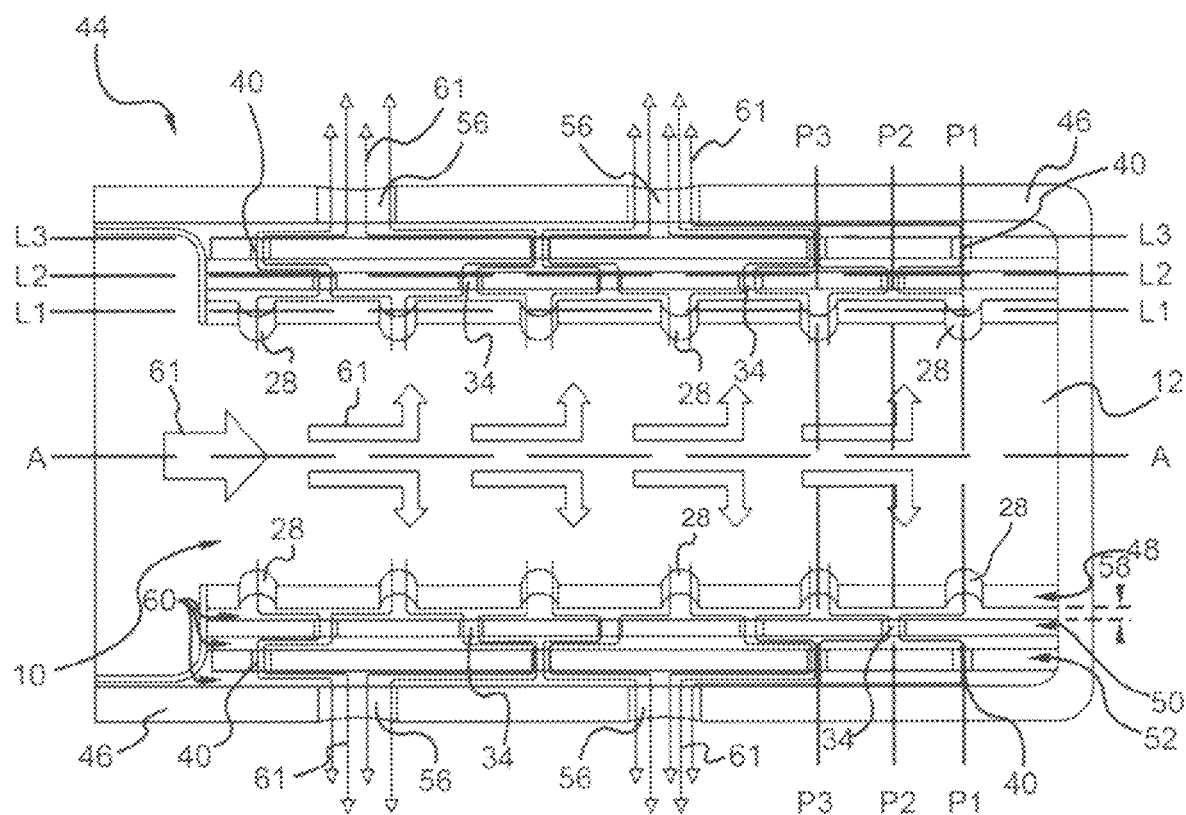
FIG. 4 is partial, section view of an inflator having a filter module inserted therein and showing exemplary inflation gas flow paths.

The unitary body 12, as pre-prepped (see FIGS. 1, 2 and 5), may be transformed into the inserted spiral rolled mode by wrapping the unitary body 12 around a correctly-sized mandrel (not shown) or by any other suitable means. Before insertion into the inflator 44 and after forming unitary body 12 into a rolled spiral of a generally tubular shape, the filter module 10 appears as shown in FIG. 3. As rolled, the filter module 10 does not need to be welded to hold its shape once inserted into an inflator 44. As inserted, the filter module 10 is coaxial with a central longitudinal axis A of a housing 46 of the inflator 44 in a rolled, spiraling fashion as shown in FIG. 4. When disposed within the housing 46, the filter module 10 has a spiraling unitary body 12 with a configuration such that the inner layer portion 18 defines an inner layer 48, the intermediate layer portion 20 defines an intermediate layer 50, and the outer layer portion 22 defines an outer layer 52, as shown in FIGS. 3 and 4.

Again, for the sake of brevity and so not to obscure the features being disclosed a single intermediate layer portion 20 and a single intermediate layer 50 are shown throughout the drawings. It should be understood, however, that there may be more than one intermediate layer portion 20, more than one intermediate layer 50 and that the intermediate layers 50 need not necessarily have the same array of holes.

Figure 8:
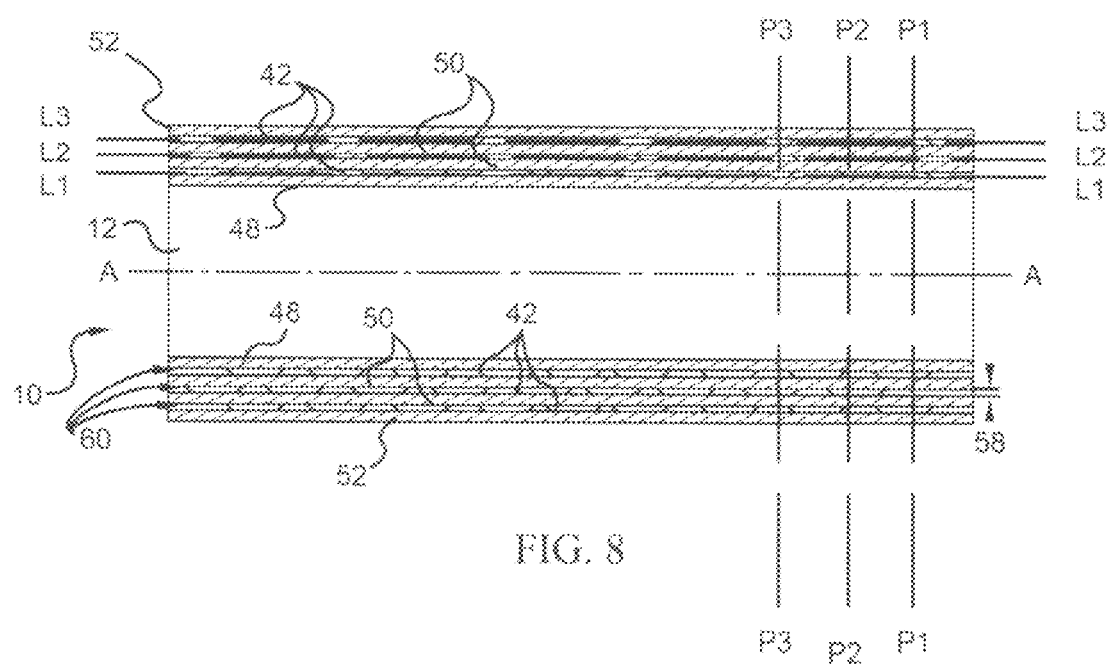
FIG. 8 is a longitudinal section view of the unitary body of FIG. 7 in a spiral rolled mode showing a spiral plenum

In one exemplary embodiment, the first array of holes 24 of the inner layer portion 18 surround the central longitudinal axis A such that the longitudinally aligned holes 28 of the first array of holes 24 define a first set of planes $P_1$ each substantially perpendicular to the central longitudinal axis A (see e.g., FIGS. 4 and 8). This occurs because the unitary body 12 has been rolled about a lateral axis and then placed within the inflator so that the lateral axis of the rolled unitary body aligns with the central longitudinal axis A of the inflator housing 46, or is at least parallel and closely proximate to the central longitudinal axis A. Consequently, the laterally aligned holes 28 of the first array of holes 24 define a first set of axes Li substantially parallel to the central longitudinal axis A (see e.g., FIGS. 4 and 8). The inner layer 48 is positioned such that the inflation gas G passes through the first array of holes 24 to reach the intermediate layer 50.

Similarly, the second array of holes 30 of the intermediate layer portion 20 surrounds the inner layer 48 and the central longitudinal axis A. Hence, the longitudinally aligned holes 34 of the second array of holes 30 define a second set of planes $P_2$ each substantially perpendicular to the central longitudinal axis A and each offset from the first set of planes $P_1$. The laterally aligned holes 34 of the second array of holes 30 define a second set of axes $L_2$ substantially parallel to the central longitudinal axis A. The intermediate layer 50 is positioned such that the inflation gas G passes through the second array of holes 30 to reach the outer layer 52.

The third array of holes 36 of the outer layer 52 surrounds the inner layer 48, the intermediate layer 50, and the central longitudinal axis A. The longitudinally aligned holes 40 of the third array of holes 36 define a third set of planes $P_3$ each substantially perpendicular to the central longitudinal axis A and each offset from the second set of planes $P_2$. The laterally aligned holes 40 of the third array of holes 36 define a third set of axes $L_3$ substantially parallel to the central longitudinal axis A. The outer layer 52 is positioned such that the inflation gas G passes through the third array of holes 36 to reach an interior wall 54 of the housing 46 and at least one diffuser hole 56.

As disclosed in at least one exemplary embodiment herein (best shown in FIG. 4), the intermediate layer 50 comprises a second array of holes 30, each hole 34 of the second array of holes 30 is not aligned with the hole 28 of the first array of holes 24 nearest such hole 34 of the second array of holes 30. Hence, the intermediate layer 50 is positioned such that the inflation gas G is redirected to move axially before the inflation gas G passes through the second array of holes 30 to reach the outer layer 52. The outer layer 54 comprises a third array of holes 36, each hole 40 of the third array of holes 36 is not aligned with the hole 34 of the second array of holes 30 nearest such hole 40 of the third array of holes 54. Again, the outer layer 52 is positioned such that the inflation gas G is redirected to move axially before the inflation gas G passes through the third array of holes 36 to reach the at least one diffuser hole 56 of the housing 46.

Each exemplary embodiment of the filter module 10 has a plurality of protrusions 42. These protrusions 42 are disposed such that the inner layer portion 18 (and therefore the inner layer 48) has at least one protrusion 42, the intermediate layer portion 20 (and therefore the intermediate layer 50) has at least one protrusion 42, and the outer layer portion 22 (and therefore the outer layer 52) has at least one protrusion 42. Each protrusion 42 disposed on the inner layer portion 18 is adjacent at least one of the holes 28 of the first array of holes 24 of the inner layer 48. Each protrusion 42 disposed on the intermediate layer portion 20 is adjacent at least one of the holes 34 of the second array of holes 30 of the intermediate layer 50. Each protrusion 42 disposed on the outer layer portion 22 is adjacent at least one of the holes 40 of the third array of holes 36 of the outer layer 52. Such protrusions maintain a gap 58 between the inner layer 48 and the intermediate layer 50, between the intermediate layer 50 and the outer layer 52, and between the outer layer 52 and the interior wall 54 of housing 46 to define a spiraling plenum 60 through which the inflation gas G passes on a tortuous path (best understood by following flow arrows 61 shown in FIGS. 4 and 12) from the gas source 62 through the filter module 10 to exit through at least one diffuser hole 46 in the inflator 46.

So long as the number of protrusions 42 are of sufficient number, size and height and dispersed sufficiently to maintain the gap 58 that defines the spiral plenum 60, protrusions 42 serve their function while strengthening the layers 48, 50, 52 of the filter module 10. Of course, having more protrusions will dictate that the flow of inflation gas G that must move around such protrusions 42 take more tortuous paths to exit the inflator 44. However, the number, size, and distribution of the protrusions 42 and the holes 28, 34, 40 may be adjusted and may be fine-tuned to optimize the desired amount of flow restriction, the desired amount of cooling, and/or the desired amount of impurities capture for the filling of an airbag in the most material-effective and cost-effective way. Since the desired amount of flow restriction, the desired amount of cooling, and/or the desired amount of impurities capture for the filling an airbag is dependent upon the size, shape, location, and the desired rate of deployment for the airbag, the number, size, and distribution of the protrusions 42 and the holes 28, 34, 40 should be adjusted and fine-tuned to optimize the effectiveness of the filter module 10.

Figure 9:
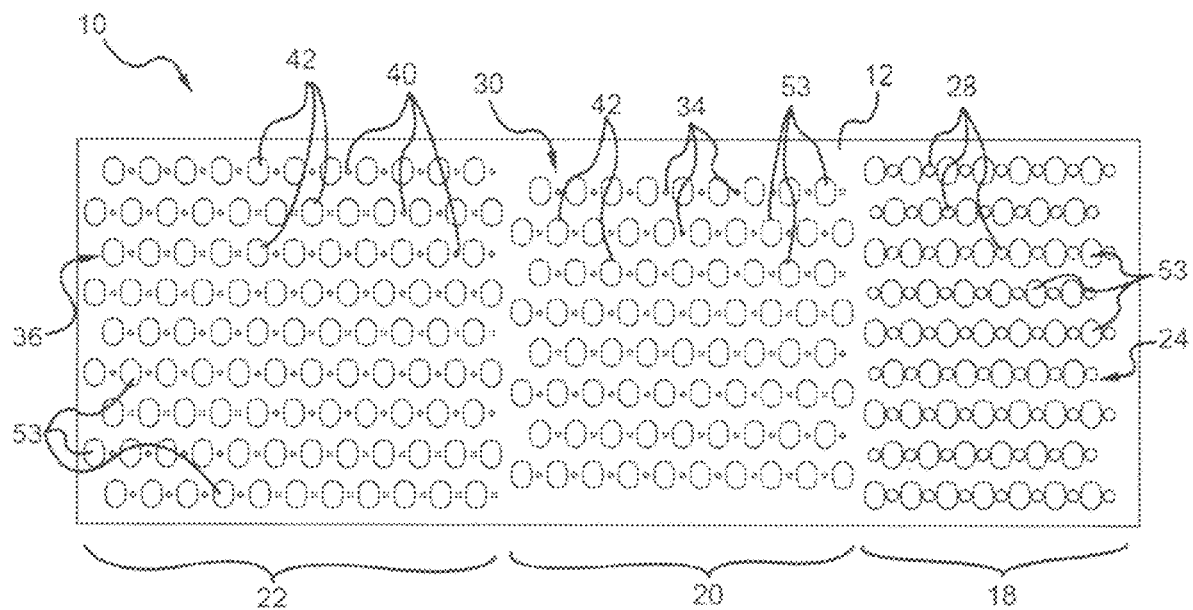
FIG. 9 is a plan view of yet another exemplary unitary body in a flat mode and showing an example of differing hole sizes.

In some embodiments, such as is shown in FIG. 9, the holes 28 of the first array of holes 24 in the inner layer 48 are each larger than the holes 34 of the second array of holes 30 in the intermediate layer 50. By enlarging the holes 28 in the first array of holes 24 in the inner layer 48, unwanted erosion of the intermediate layer 50 due to the flow 61 of hot inflation gas G jetting straight through the holes 28 of the first array of holes 24 against the inside wall of the intermediate layer 50 can be mitigated. The size of the holes 28 of the first array of holes 24 may be enlarged until erosion is no longer observed. Similarly, the holes 34 of the second array of holes 30 can also be enlarged to avoid erosion on the outer layer 52 of the filter module 10.

Additionally, a desired choking point in the flow 61 of inflation gas G through the inflator 44 may be determined by adjusting the number and/or size of the holes 28, 34, 40 in the first array of holes 24, in the second array of holes 30, and in the third array of holes 36, as well as the number and/or size of the diffuser holes 56.

Figure 6:
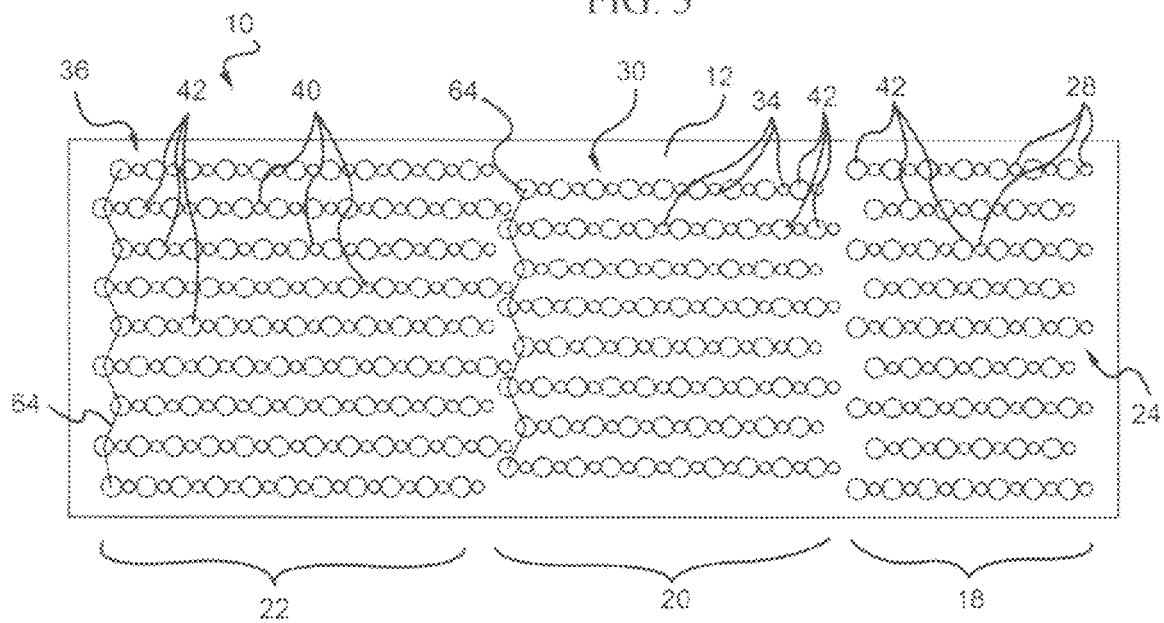
FIG. 6 is a plan view of an alternative exemplary unitary body in a flat mode and showing exemplary staggered lateral lines.
Figure 7:
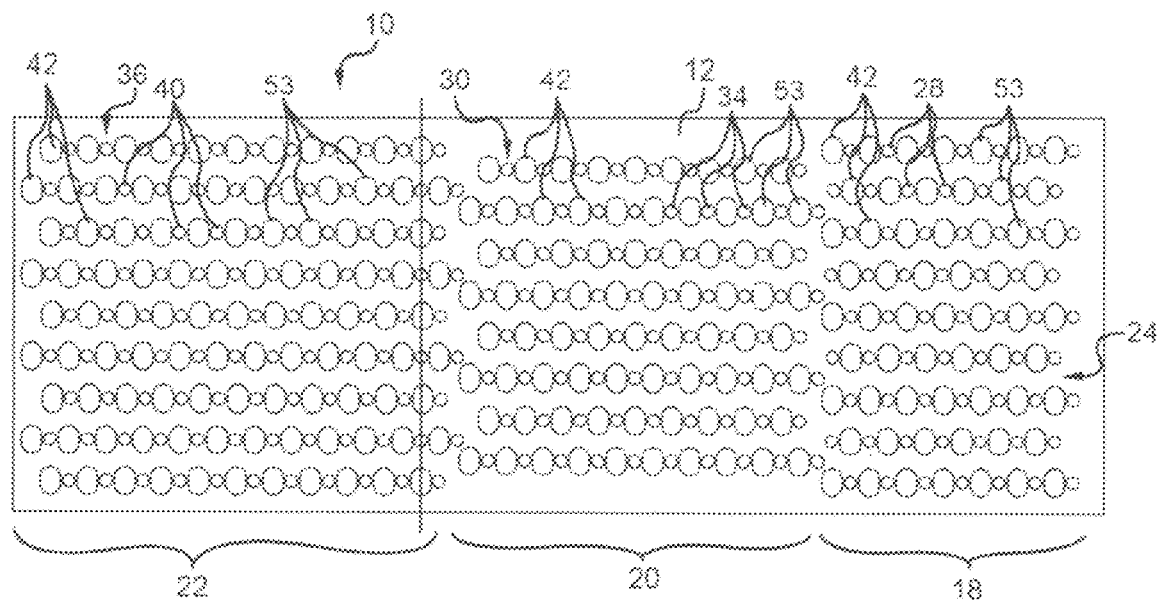
FIG. 7 is a plan view of another exemplary unitary body in a flat mode and showing exemplary laterally elongated protrusions arranged in staggered lateral lines.

In another exemplary embodiment of the unitary filter module 10 of the present disclosure, as shown in FIGS. 6, 7, and 9, the holes 28, 34, 40 and protrusions 42 may be arranged in a staggered pattern 64. This staggered pattern 64 may be incorporated into the first array of holes 24 in the inner layer 48, the second array of holes 30 in the intermediate layer 50, and/or the third array of holes 36 in the outer layer 52. One example of a staggered pattern 64 has multiple lines of longitudinally aligned holes and each hole of any of the multiple lines of longitudinally aligned holes aligns laterally with at least one hole of another of the multiple lines of longitudinally aligned holes, but does not align laterally with any of the holes of at least one other of the multiple lines of longitudinally aligned holes.

Figure 10:
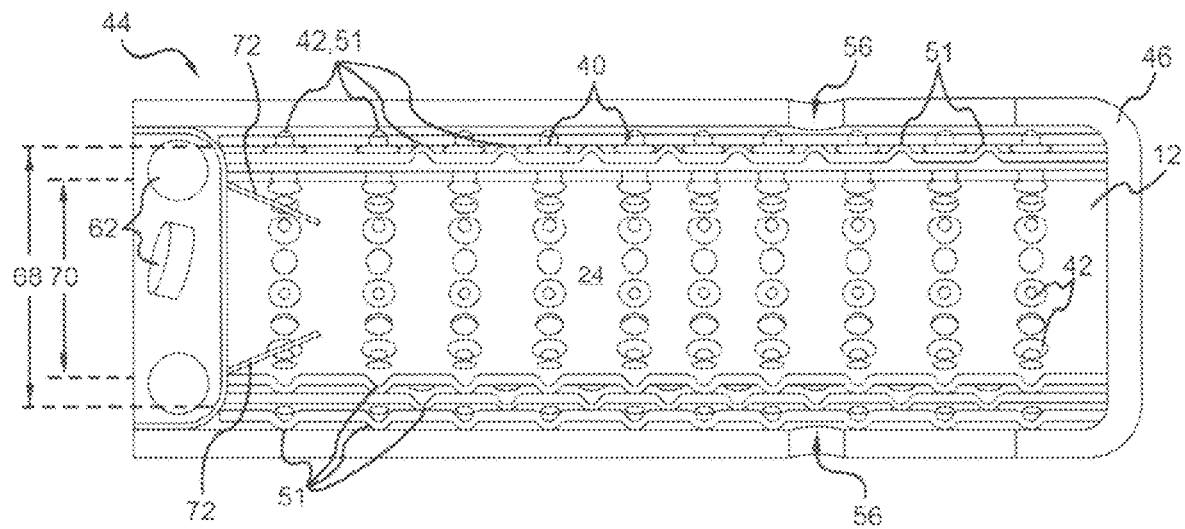
FIG. 10 is partial, section view of an inflator having a filter module disposed within the inflator housing in an inserted, spiral rolled mode.
Figure 11:
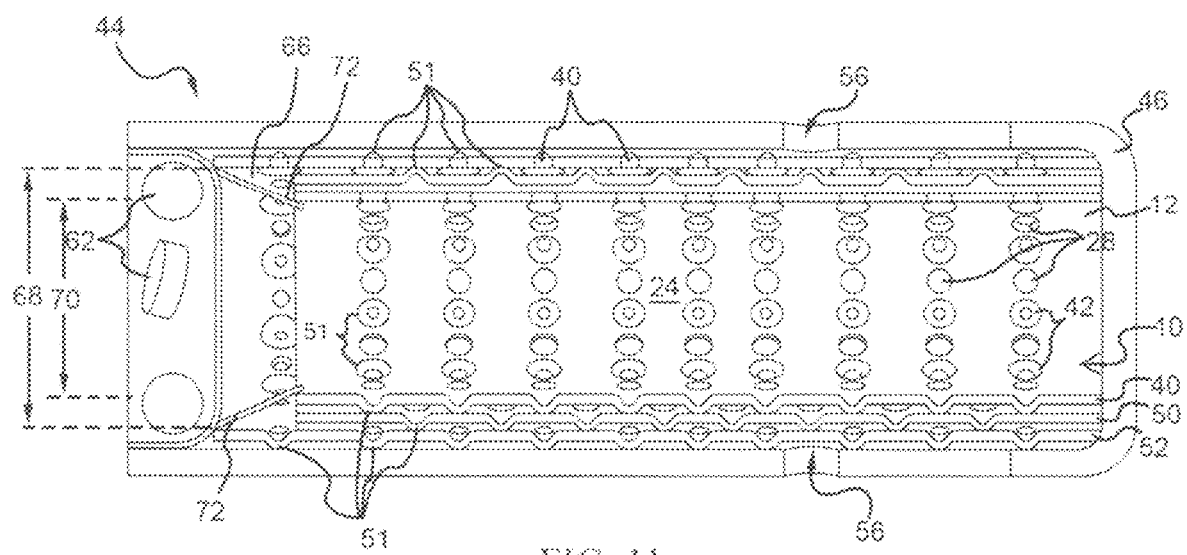
FIG. 11 is partial, section view of an inflator having a filter module disposed within the inflator housing in an inserted, spiral rolled mode similar to FIG. 10, except having a filter module with a greater width so to create a larger diameter for burst disk rupture.

In some embodiments, such as shown in FIG. 11, the unitary body 12 of the filter module 10 is wider at the outer layer 52 than at the inner and intermediate layers 48, 50. (FIG. 10 is provided for contrast, wherein the width of each layer 48, 50, 52 are the same.) When wrapped into a spiral, the outer layer 52 is longer at one end than the inner and intermediate layers 48, 50. More space 66 is provided at that end because the inner diameter 68 of the outer layer 52 is larger than the inner diameter 70 of the inner layer 48. For inflators 44 with frangible burst disks 72 disposed between the gas source 62 and the filter module 10, the burst disk 72 has a larger diameter opening capability than it would have had if the inner layer 48 abutted the burst disk 72. This wider configuration for the outer layer 52 enables the burst disk 72 to open over the full, inner diameter 68 of the outer layer 52.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A unitary filter module for insertion into an inflator for an airbag assembly, the inflator having a gas source, the unitary filter module having a flat mode and an inserted spiral rolled mode and comprising:
   a unitary body having a length, a width, an inner layer portion, an intermediate layer portion, and an outer layer portion in the flat mode:
      the inner layer portion comprises a first array of holes;
      the intermediate layer portion comprises a second array of holes;
   a plurality of protrusions; and
   wherein at least one of the first array of holes and the second array of holes has a staggered array pattern wherein the staggered array pattern comprises multiple lines of longitudinally aligned holes and each hole of any of the multiple lines of longitudinally aligned holes aligns laterally with at least one hole of another of the multiple lines of longitudinally aligned holes but does not align laterally with any of the holes of at least one other of the multiple lines of longitudinally aligned holes;
      the unitary body in the inserted spiral rolled mode is rolled around a central longitudinal axis into a spiral, each protrusion maintaining a gap between the inner layer portion and the intermediate layer portion; and
   wherein the unitary body of the filter module is wider at the outer layer portion than at the inner layer portion and intermediate layer portion, and the inflator has a frangible burst disk between the gas source and the unitary filter module thereby enabling the burst disk to open over the full diameter of the outer layer portion.

2. The filter module of claim 1, wherein the protrusions are dimples.

3. The filter module of claim 2, wherein each dimple is elongate.

4. The filter module of claim 1, wherein at least one of the size, shape, number, location, and distribution of the holes and protrusions are adjustable to enable the effectiveness of the filter module to be fine-tuned.

* * * * *